US012723460B2

(12) United States Patent
Ritter et al.

(10) Patent No.: US 12,723,460 B2
(45) Date of Patent: Sep. 1, 2026

(54) ELECTRIC SIDE DOOR DRIVE ASSEMBLY FOR A VEHICLE

(71) Applicant: Stabilus GmbH, Koblenz (DE)

(72) Inventors: Andreas Ritter, Koblenz (DE); Bernd Rosenstein, Koblenz (DE); Tim Bartsch, Koblenz (DE); Peter Oster, Koblenz (DE); Viola Schneider, Koblenz (DE); Henri Becker, Koblenz (DE)

(73) Assignee: STABILUS GMBH, Koblenz (DE)

( * ) Notice: Subject to any disclaimer, the term of this patent is extended or adjusted under 35 U.S.C. 154(b) by 4 days.

(21) Appl. No.: 18/435,454

(22) Filed: Feb. 7, 2024

(65) Prior Publication Data

US 2024/0271475 A1 Aug. 15, 2024

(30) Foreign Application Priority Data

Feb. 13, 2023 (DE) ..................... 10 2023 103 431.6

(51) Int. Cl.
*E05F 15/70* (2015.01)
*E05F 15/79* (2015.01)

(52) U.S. Cl.
CPC .............. *E05F 15/70* (2015.01); *E05F 15/79* (2015.01); *E05Y 2400/528* (2024.05); *E05Y 2900/531* (2013.01)

(58) Field of Classification Search
CPC ......... E05F 15/70; E05F 15/79; E05F 15/622; E05F 15/611; E05F 15/40; E05Y 2400/528; E05Y 2900/531; E05Y 2201/21; E05Y 2201/408; E05Y 2400/3013; E05Y 2400/31; E05Y 2400/334; E05Y 2400/36; E05Y 2400/446; E05Y 2400/3015;
(Continued)

(56) References Cited

U.S. PATENT DOCUMENTS 10,814,860 B1 * 10/2020 Gaither ................. B60W 20/40
12,291,915 B2 5/2025 Roman et al.
(Continued)

FOREIGN PATENT DOCUMENTS

DE 102010053225 A1 6/2012
DE 102018210426 A1 1/2020
(Continued)

OTHER PUBLICATIONS

German Application No. 102023103431.6, Office Action mailed Jun. 9, 2023, 9 pages.

*Primary Examiner* — Muhammad Shafi
(74) *Attorney, Agent, or Firm* — Kilpatrick Townsend & Stockton LLP

(57) ABSTRACT

An electric side door drive assembly for a vehicle having a length-adjustable electric actuator to bring about opening and closing of the side door, and a door movement sensor unit designed to detect stopping and a current position of the side door during opening or closing of the side door. In the event of stopping of the side door detected by the door movement sensor unit, a controller determines, on the basis of side door position data provided by the door movement sensor unit, a necessary current strength which is to be supplied to the electric motor to hold the side door in its current position, and to deliver the necessary current strength to the motor of the actuator for a holding operation.

15 Claims, 1 Drawing Sheet

Figure 1:
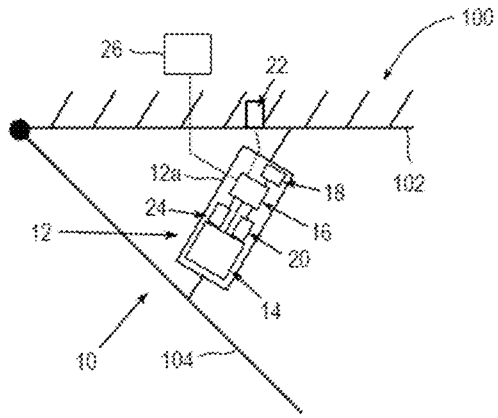

(58) Field of Classification Search
CPC ........... E05Y 2400/306; E05Y 2400/40; E05Y 2400/812; E05Y 2400/818; E05Y 2800/30; B60J 5/047
USPC ........................................................... 701/49
See application file for complete search history.

(56) References Cited

U.S. PATENT DOCUMENTS

| | | | | |
|---|---|---|---|---|
| 2008/0296927 | A1* | 12/2008 | Gisler | E05F 15/43 296/146.4 |
| 2012/0137591 | A1 | 6/2012 | Bochen et al. | |
| 2012/0154136 | A1* | 6/2012 | Connelly, Jr. | B60Q 9/00 340/457 |
| 2012/0180391 | A1* | 7/2012 | McKee | E05F 15/73 318/446 |
| 2017/0342758 | A1* | 11/2017 | Grudzinski | E05F 1/1091 |
| 2020/0386037 | A1* | 12/2020 | Battlogg | E05F 15/41 |

FOREIGN PATENT DOCUMENTS

| | | | |
|---|---|---|---|
| DE | 102019209299 | A1 | 12/2020 |
| DE | 102019212311 | A1 | 2/2021 |
| DE | 102020112140 | A1 | 11/2021 |
| DE | 102023103224 | A1 | 8/2023 |
| DE | 102023108186 | A1 | 10/2024 |

* cited by examiner

ELECTRIC SIDE DOOR DRIVE ASSEMBLY FOR A VEHICLE

CROSS REFERENCE TO RELATED APPLICATION

This application claims priority to German Patent Application No. 10 2023 103 431.6, filed in Germany on Feb. 13, 2023, the entire contents of which are hereby incorporated herein by this reference.

DESCRIPTION

The present invention relates to an electric side door drive assembly for a vehicle, a vehicle comprising at least one such side door drive assembly, and a method for operating a side door drive assembly of this kind.

In recent times, in the automotive industry, in order to increase the operating comfort, the approach has been taken to equip the doors and tailgates of new vehicles with active drives, such that in addition to a purely manual opening and closing, an automatic or supported opening and closing, for example of the side doors of motor cars, can now be carried out. For this purpose, typically electric drives are used, i.e. in particular linear actuators, which are provided between the vehicle body of the corresponding vehicle and a side door hinged thereto.

However, in particular in cases in which such vehicles have been parked on steep ground, it may be the case that side doors of the corresponding vehicles tend to open further or to close on account of the tilt of the vehicle and thus the pivot axis of the side door. This behavior is uncomfortable for the driver and passengers of such vehicles, if the corresponding side door opens automatically as far as the stop or does not remain in an open state, since this makes it more difficult to get in or out of the vehicle or also to load it from the side. Under some circumstances, this could even lead to people located in the pivot range of the side door being in danger. Furthermore, for example in cases in which the vehicle in question is parked beside other vehicles, this can result in an automatically opening side door hitting an adjacent vehicle and damaging it, and therefore various devices and strategies have been proposed for preventing such behavior and holding vehicle side doors at an opening angle manually specified by a user.

For example, in the prior art permanently acting or electrically or magnetically adjustable friction brakes or magnetic brakes were used, which were in particular integrated in drive devices of such side doors and which enable side doors of vehicles to be held, in a passive manner, at any opening angles.

An approach that deviates slightly from this was pursued in a similar case of use in WO 2021/224 219 A, in which a drive comprising a mechanical spring element was used for compensating a weight force in a tailgate drive, the spring element being intended to reduce the speed of fall of the tailgate in the event of a failure of the drive. A similar approach is also known for example from DE 10 2008 057 014 B4.

However, it has been found here that permanently acting brakes have the disadvantage that they increase the friction of the overall system, and thus also the manual operating force for a user, in particular the breakaway force, to an uncomfortably high level, even in flat vehicle positions. It would therefore be desirable to reduce this operating force for a user during a manual actuation and movement of the corresponding vehicle side door. Furthermore, even during fully automatic door movements the motor of the corresponding drive assembly must always apply an additional torque for overcoming the braking force, which leads to an energetically inefficient operation when permanently acting brakes are provided.

In contrast, switchable or adjustable brakes act only in the event of the doors being at a standstill and, depending on the design, only in the case of tilting positions of the vehicle in which the friction of the remaining system is not sufficient for holding the corresponding side door in the desired opening angle. However, disadvantages of such solutions are the additionally required installation space and the costs for the switching devices of the switchable or adjustable brakes, i.e. for example a servomotor or a lifting magnet, and a higher fault liability due to the greater complexity and number of components of the system formed thereby.

Lastly, mechanical friction brakes or devices for switching or adjusting brakes always lead to undesired noise and, on account of wear, can lead, over time, to a loss of quality or even a malfunction of the system.

The object of the present invention is therefore that of providing an improved electric side door drive assembly for a vehicle, which enables holding of the corresponding side doors at any opening angles in a pivot range thereof, in particular in tilted positions of the vehicle in which the passive holding force of the drive system is not sufficient for holding the door. In particular, in this case, the braking torque of permanently acting brakes is intended to be reduced, or such braking is intended to be omitted entirely, which increases the efficiency in the case of driven movements, and comfort in the case of manual movements. Furthermore, the present invention is intended to provide a more favorable alternative, with regard to installation space, costs, and system complexity, to switchable or adjustable brakes in such side door drive assemblies.

For this purpose, and in order to achieve the objects described above, the electric side door drive assembly for a vehicle according to the present invention comprises a length-adjustable electric actuator which is arranged between a vehicle body of the vehicle and the side door, in order to bring about opening and closing of the side door, and for this purpose comprises a controllable electric motor, a control unit which is operationally coupled to the actuator and which is associated with a storage unit on which geometric parameters of the vehicle and operating parameters of the actuator are stored, and a door movement sensor unit which is operationally coupled to the control unit and is designed to detect stopping and a current position of the side door during opening or closing of said side door. In this case, according to the invention the control unit is designed to determine, in the case of stopping of the side door detected by the door movement sensor unit, on the basis of side door position data provided by the door movement sensor unit, and the geometric parameters of the vehicle and operating parameters of the actuator stored in the storage unit, a necessary current strength which is to be supplied to the electric motor of the actuator in order to hold the side door in its current position, and to deliver the necessary current strength, to the motor of the actuator, for such a holding operation.

Accordingly, in the drive assembly according to the invention the necessary holding torque of permanently acting or switchable brakes can be reduced, or such components can be omitted entirely, by the use of the actuator motor for generating an active holding torque. As a result, the weight, necessary installation space, and costs of the drive assembly according to the invention are reduced, such that said drive assembly is very well suited for use in the automotive industry.

Accordingly, as a result of the concept of an active holding operation, within the context of the present invention, the wear of brakes, in particular of friction brakes or the like, is reduced or omitted entirely, which increases the service life of the side door drive assembly according to the invention. Furthermore, compared with friction brakes or switchable or adjustable brakes, significantly lower acoustic emissions arise in the case of the generation, according to the invention, of the holding torque for the holding operation by the actuator motor. Moreover, mechanical or electromagnetic brakes always have a tolerance which can depend in particular on the temperature of the components generating the braking action. However, such tolerances make speed regulation during an automatic door movement, and current regulation during an assisted manual door movement, more difficult. Since, in the side door drive assembly according to the present invention, the portion of this friction can be reduced, or it can be omitted entirely, such tolerance influences are reduced and the controllability, and thus the quality and the haptic impression, of the driven door movements are improved.

Furthermore, it should be noted that the haptics of the door is improved, within the context of the present invention, also during a start of an assisted manual movement. Specifically, under otherwise identical environmental conditions, permanently acting or switchable brakes always generate the same holding torque, irrespective of the tilting position of the vehicle, which torque, however, is to be designed by the manufacturer to be so strong that the door is reliably held open at every opening angle of the door, even in marginal tilts, for example a slope of up to 20%, with respect both to the length and to the width direction of the vehicle. However, since in general vehicles are parked on significantly less sloping ground, and in particular also in a substantially horizontal orientation, this high basic holding torque leads to uncomfortably high breakaway forces for users of the door, at the start of manual door movements. Although this problem can be overcome in part by steplessly adjustable brakes, these are associated with disadvantages with respect to their complexity, the necessary installation space, their acoustics, and their costs.

In contrast, in a side door drive assembly according to the present invention, instead of a permanently acting or switchable or adjustable brake, the holding torque for a holding operation can be generated by the actuator motor itself, such that said holding torque can be set, via controlling the current strength delivered to the motor, for example depending on the vehicle tilting position and the opening angle of the door, in such a way that a user has to overcome approximately the same comfortably low breakaway forces in all conceivable tilt and opening angle scenarios. At the same time, it can be ensured that even in extreme tilting positions sufficient force reserves are still present to ensure stable holding of the side door even in the case of external influences such as wind or shocks, which can exert additional forces or torques on the corresponding side door.

Accordingly, the side door drive assembly according to the invention can further comprise a tilt sensor unit which is operationally coupled to the control unit and which is designed to detect a tilt of the vehicle relative to a horizontal plane, and/or can comprise a temperature sensor unit which is operationally coupled to the control unit and which is designed to detect the temperature of the motor of the actuator, the control unit furthermore being designed to take into account the tilt of the vehicle and/or the temperature of the motor, in an appropriate manner, when determining the necessary current strength.

This makes it possible, in such embodiments of the side door drive assemblies according to the invention, to adjust the current strength, required for the holding operation, to the tilt of the vehicle and/or the temperature of the actuator motor. It should be noted that corresponding sensors for determining a tilt of vehicles and temperatures of electric motors are commercially freely available and can be integrated without problem into the control logics of the drive assembly according to the invention. In this connection, it is further noted that the thermal monitoring of the actuator motor can additionally be prevented by thermal overloading thereof, for example in that the protective closing movement, discussed further below, is triggered in such a case, in which an undesired high motor temperature is identified, as a result of which thermally induced wear of the actuator motor can be prevented. Furthermore, in connection with the tilt sensor unit it is furthermore noted that such tilt angles of the vehicle can be determined based on a longitudinal axis of the vehicle and/or based on a width axis of the vehicle, such that the corresponding tilt angle relative to a strictly horizontal orientation or position of the vehicle can be taken into account by the control unit in each case when determining the necessary current strength.

Although, in principle, the type of the length-adjustable electric actuator is firstly not specified in the present invention, as long as an active holding force can be generated thereby for a side door, in addition to the operating forms provided in any case, this can be designed in particular as a spindle drive having a permanently excited brushed direct current motor or having a brushless direct current motor. Such actuator types are known in the prior art, and are characterized by reliability, a long service life, and a simple design. In this case, it is noted at this point that the corresponding actuator motor can be formed entirely without a brake, comprising a permanent brake, or comprising a switchable brake, the advantages of the present invention coming into play to the greatest extent, however, in particular in embodiments which are free of a brake. However, the possibility should not be excluded that a permanent or switchable brake can additionally be provided for assisting the holding operation, in order to reduce the necessary holding currents in an appropriate manner.

Furthermore, it should be noted that, in particular embodiments of the present invention, the control unit can be integrated with the actuator and can in particular be received in a housing of the actuator. Alternatively, it is of course also conceivable to provide the control unit outside of the actuator and to couple it to the actuator motor merely operationally for actuation thereof, it then being possible for the corresponding control unit to be arranged for example at a suitable position in the vehicle that is equipped with the side door drive assembly.

Furthermore, it should be noted that the door movement sensor unit can be formed by a position encoder associated with the actuator, i.e. a device for detecting the current lift position or the current length of the electric actuator, which enables a further improved integration of the assembly according to the invention and a reduced installation size. Alternatively, however, the door movement sensor unit could also be formed by any other suitable sensor type, for example a sensor unit, which detects the current opening angle of the side door in the region of its articulation to the vehicle body and outputs corresponding data.

Since it can be assumed that the module formed of the side door drive assembly and the side door, and its articulation to the vehicle always has a certain intrinsic braking torque, even if no dedicated brake is provided in the drive assembly, the control unit can furthermore be designed to firstly determine, before determining the necessary current strength, whether a passive holding force of the actuator is sufficient for holding the side door in its current position. A situation of this kind would occur for example if self-blocking of the actuator motor in certain configurations, for example small tilt angles of the vehicle, would already be sufficient for holding the vehicle door in its current position, such that at this point no energization of the actuator motor at all would be necessary for a holding operation. The passive holding force of the actuator flowing into this can also be derivable from the data stored in the storage unit of the control unit or for example also be stored independently in its own characteristic diagram or by means of parameterization in a manner dependent at least on a tilt angle of the vehicle, which can be consulted, in such case, for evaluation. Furthermore, the resulting passive holding force can also be taken into account when calculating the necessary current strength, since it is to be assumed that such blocking of a movement would always support the holding operation in a certain manner, and therefore a smaller holding current would be required.

Even if it is in principle conceivable to deliver the specific necessary current strength to the actuator motor in a variable manner, in alternative embodiments the control unit can also be designed to convert the determined necessary current strength into a duty cycle for a pulse width modulation operation of the motor of the actuator, and to deliver the corresponding, pulse width modulated necessary current to the motor. Such embodiments of actuation means of electric motors are characterized in that merely one single value of a predetermined current strength is delivered to the motor in a clocked manner at a high frequency. In this case, the duty cycle corresponds to a duty factor or a temporal portion at which said constant "in" current is delivered, and is thus a measure for the percentage portion of a current strength, integrated over time, based on the constant in current.

Furthermore, for a further improvement of the holding operation, and in particular for establishing a feedback loop, the control unit can be designed for normal operation of the motor, in that, when a movement of the side door during holding operation is identified, in particular by the door movement sensor unit, an adjustment of the necessary current strength or of the duty cycle is performed. In this way, the holding operation can be readjusted in a simple manner, if it becomes apparent in the meantime that the door moves despite the delivered holding current. Possible factors for this could for example be a worsened efficiency of the motor at a constant current strength, in particular due to heating or aging thereof that is to be observed over its service life, or also external influences, such as gusts of wind or shocks acting on the side door.

Furthermore, the control unit can be designed to temporally limit the holding operation, in that the delivery of current to the motor of the actuator, and thus the active holding operation, is ended after a predetermined maximum holding time. This temporal restriction of the holding operation serves, in the manner already briefly discussed above, to protect the actuator motor against overheating, and furthermore to prevent excessive energy consumption of the actuator motor in a temporally unrestricted holding operation. In this case, the maximum holding time can be selected to be constant and be stored in a fixed manner in the control unit, but it can also be adjusted in a variable manner depending on particular parameters, for example the heat development in the actuator motor or the determined tilt of the vehicle relative to the horizontal.

In this connection, the control unit can furthermore be designed, after the maximum holding time has elapsed, to transfer the side door, in the context of a protective closing movement, into a state in which a passive holding force of the actuator is sufficient for holding the side door in this state or for completely closing the side door. In this case, the complete closing of the side door can be possible in particular if, in the respective configuration and set-up, the passive holding force of the actuator is under no circumstances sufficient to hold the side door in the corresponding state, for example at very significant vehicle tilts, or if in the corresponding embodiment said passive holding force has not been determined or is not known at all. It can furthermore be provided to perform the protective closing movement of the side door at lower speed than a closing movement of the side door in normal operation of the side door drive assembly, in order to ensure the safety of said protective closing operation and to prevent unexpected jamming of people or objects during said operation.

Furthermore, the corresponding side door drive assembly can further comprise an optical or acoustic output unit which is operationally coupled to the control unit and is designed to output a signal in the event of a directly imminent protective closing movement and/or during a protective closing movement. This can for example be an acoustic warning signal or a corresponding voice output, and alternatively or in addition an optical representation of a warning. For example, in this connection the optical output unit can be integrated with a vehicle display that is installed in any case, such that a warning message about an imminent or currently occurring protective closing movement can be displayed in a customary manner on a vehicle display.

Moreover, the control unit can furthermore be designed, upon detection of a manual actuation of the side door during the holding operation, in particular by the door movement sensor unit or by means of a voltage induced in the motor of the actuator, to transfer the actuator into an active supporting operation, in which a force acting in the direction of the manual actuation is exerted on the side door, in that a corresponding supporting current is delivered to the motor of the actuator. Said supporting current can also be pulse width modulated in the manner described above.

In particular, in this connection, during the detection of the manual actuation, a speed and/or acceleration of the side door can furthermore be detected, and the supporting current can be adjusted on the basis of the detected speed and/or acceleration of the side door. This measure serves in particular to ensure a harmonic transition between the holding operation and a closing operation, such that a user does not experience any jerky movement of the door in this case.

Furthermore, it is noted that the parameters of the vehicle stored in the storage unit can include a mass and/or center of gravity of the side door, and/or the operating parameters of the actuator can include a friction, an efficiency, a transmission and/or a motor constant of the actuator. Of course, in this case, however, further parameters are also conceivable, and it is furthermore also possible to detect further variables by additional sensor units and to have said variables flow into the control of the active holding operation via the control unit. Accordingly, the mentioned parameters, and the variables, already described above, which are detected by sensor units, are not a conclusive list. Rather, it is conceivable to have any describable or determinable variable flow into the holding operation.

According to a further aspect, the present invention relates to a vehicle comprising a vehicle body and at least one side door pivotably hinged thereto, wherein a side door drive assembly according to any of the preceding claims is arranged between the vehicle body and the side door. In this case, the side door drive assembly is preferably designed and provided both for automatic and also for supporting operation, in addition to the holding operation according to the invention.

Furthermore, the present invention relates to a method for operating an electric side door drive assembly of the type according to the invention as described above, comprising determining stopping of the side door during opening or closing, and a current position of the side door, determining a current strength necessary for an active holding operation, on the basis of side door position data, geometric data of the vehicle and operating parameters of the actuator, and delivering the necessary current strength to the motor of the actuator.

In this case, attention should be drawn, at this point, to the fact that the developments and optional additional features introduced above in connection with specific embodiments of the side door drive assembly are intended to be able to be combined in the same way with the method according to the invention, such that the corresponding features of the dependent claims relating to the side door drive assembly according to the invention are all intended to also be included in the present disclosure as optional features of the method according to the invention. In this case, reference is made for example to the additional step of determining whether a passive holding force of the actuator is sufficient for holding the side door in its current position, before determining the necessary current strength, and the provision of a maximum holding time and a subsequent ending of the holding operation, which are likewise intended to be understood and included as optional method steps, in the manner just discussed.

Figure 2:
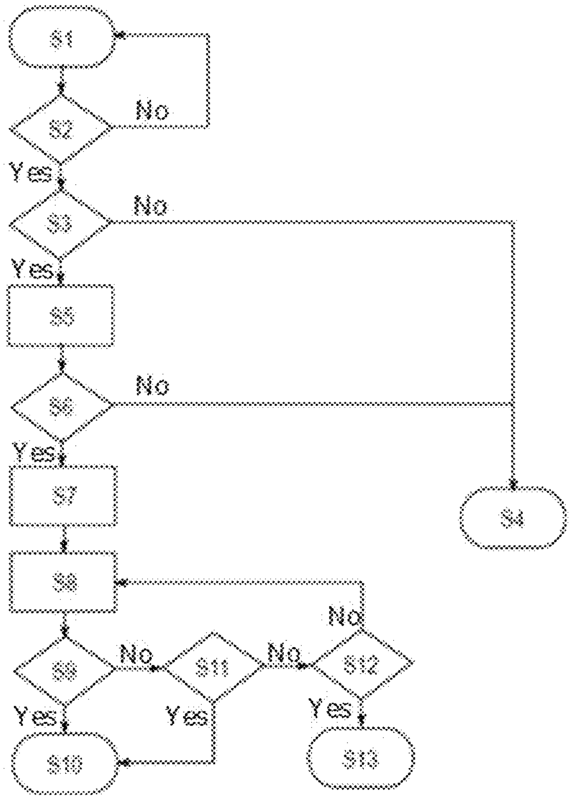

Further features and advantages of the present invention will become clearer from the following description of an embodiment thereof, when considered together with the accompanying drawings. In said drawings, in detail:

FIG. 1 is a schematic plan view of a side door drive assembly according to the invention; and FIG. 2 is a flow diagram illustrating a method according to the invention for operating the side door assembly from FIG. 1.

FIG. 1 is firstly a schematic plan view of a side door drive assembly according to the invention of a vehicle 100 (not shown in greater detail), which drive assembly is denoted very generally by reference sign 10. In this case, the side door drive assembly 10 comprises a length-adjustable electric actuator 12 in the form of a spindle drive (known per se) having a housing 12*a* and an electric actuator motor 14, the actuator 12 being arranged between the vehicle body 102 and a side door 104 pivotably hinged thereto, and being coupled to both. It should be noted at this point that for example two or four side doors 104 can be installed in the vehicle 100, which doors can all be provided with such a side door drive assembly 10 according to the invention.

Furthermore, the side door drive assembly comprises a control unit 16 which is operationally coupled to the actuator 12 and in particular to the actuator motor 14 for actuation and energization, and which is associated with a storage unit 18 on which geometric parameters of the vehicle 100 and operating parameters of the actuator 12 are stored. The control unit 16 is also capable of monitoring the current motor speed of the actuator motor 14, for example in that a voltage induced therein during a manual operation is detected. In this case, the control unit 16 is arranged inside the actuator housing 12*a*, which applies in a similar manner for a door movement sensor unit 20 designed as a position encoder, which is designed to detect a pivot position or an opening angle and a pivot movement of the side door 104 relative to the vehicle 102, and in particular to detect stopping of such a pivot movement.

As further sensor units operationally coupled to the control unit 16, the side door drive assembly 10 comprises a tilt sensor unit 22 which is associated with the vehicle body 102 and is designed to detect a tilt of the vehicle body 102 relative to a horizontal plane, and a temperature sensor unit 24 which is arranged inside the actuator housing 12*a*, in the region of the actuator motor 14, and is designed to detect the temperature of the actuator motor 14.

Lastly, with reference to FIG. 1, the output unit 26 which is associated with the vehicle 100 and operationally coupled to the control unit 16 is also noted, which output unit, depending on the embodiment, can be designed to inform an occupant of the vehicle 100 of particular operating states of the side door drive assembly 10, in particular the protective closing movement described below.

In this case, it is noted that the side door drive assembly 10, and in particular its control unit 16, is designed to typically enable operating processes provided for such door drives, for example an active opening or closing operation of the side door 104 of the vehicle 100 and a manual opening or closing operation, in which the side door 104 can be opened, closed, or pivoted into any opening angle manually by a user. At the same time, however, the side door drive assembly 10 according to the invention also allows for what is known as active holding operation, in which the side door 104 can also be held open, by appropriate energization, for example by means of pulse width modulation, in situations having a constant opening angle in which an external force acts on said door in the direction of an opening or closing, i.e. in particular when the vehicle 100 is in a tilt position deviating from the horizontal. With reference to the flow diagram from FIG. 2, in the following a corresponding method for carrying out an active holding operation in the side door drive assembly 10 from FIG. 1 will be explained.

Firstly, in step S1, the door movement sensor unit 20 detects that the side door 104 is moving, and it is checked, in a step S2, whether in this case the door movement has fallen below a specified threshold value ("yes" in step S2), which is a criterion for the side door 104 having stopped its movement. At the same time, at this point the current position of the side door 104 or its opening angle is determined. As soon as it has been identified that the side door 104 has stopped, the process passes to step S3, in which a tilt of the vehicle 100 relative to the horizontal is detected by the tilt sensor unit. Should this tilt be zero or fall below a predetermined minimum tilt ("no" in step S3), then the process ends at this point at S4, since no active holding operation is required.

If, on the other hand, a tilt of the vehicle is not zero ("yes" in step S3), then in step S5 the required motor torque $T_{actuator}$ is calculated on the basis of the geometry data of the vehicle 100 stored in the storage unit 18, and the detected tilt of said vehicle, from the torque equilibrium during holding of the side door 104, on the basis of the formula $$T_{breakaway}+T_{gravity}+T_{cctuator}=0. \quad \text{(Equation 1)}$$

In this case, the breakaway torque $T_{breakaway}$ depends, in a known manner, via the formula $$T_{breakaway}=F_{breakaway}*I_{arm}, \quad \text{(Equation 2)}$$

on the breakaway force $F_{breakaway}$ and the lever length $I_{arm}$ of the side door 104.

Furthermore, in order to calculate the torque $T_{gravity}$ that acts on the side door 104 and is caused by gravitational force thereof, known geometric and structural variables, as well as the determined tilt of the vehicle 100, are used, i.e. in particular the mass of the side door 104, the position of the center of gravity of the side door 104 in its closed state, the orientation of its pivot axes vector, pitch angle and roll angle of the vehicle 100, and the opening angle of the side door 104. In this connection, the opening angle constitutes a measure for the side door position within the meaning of the present invention, which can be determined by means of the door movement sensor unit 20 discussed above. In this case, it is conceivable, as soon as the pitch angle and roll angle of the vehicle 100 have been determined, to create a characteristic diagram, on the basis of the invariable properties of the side door 104 stored in the storage unit 18, in which characteristic diagram $T_{gravity}$ is plotted against the opening angle, such that during a movement of the side door 104 and the associated change in the opening angle the corresponding value of $T_{gravity}$ can be accessed quickly.

In this case, the specific calculation thereof is based on a known transformation of the pivot axis and of the center of gravity of the door by means of a reference system transformation using respective rotation matrices with respect to the roll angle and the pitch angle of the vehicle 100, which will not be discussed in detail here since it is readily derivable from mathematical principles.

The actuator torque $T_{actuator}$ required for achieving the torque equilibrium from Equation 1 results, in turn, as the product of the actuator force and the actuator lever arm, which depends on the connection points of the actuator 12 on the vehicle body 102 and the side door 104 in the closed state, the orientation of the pivot axis without a vehicle tilt, and the opening angle of the side door 104. Accordingly, in this way, the torque to be applied by the actuator motor 14 for a holding operation, and thus also the force that is to act, can be derived.

Since, furthermore, the passive holding force of the actuator 12 is known or can also be derived from the known properties thereof according to known principles, in the next step S6 a comparison can be made as to whether the passive holding force is already sufficient for holding the side door 104 in its current opening angle, or whether an energization of the actuator motor 14 is required for holding the side door 104. If this is not the case ("no" in step S6), i.e. the passive holding force alone is already sufficient, then the process ends at this point in step S4, since no holding operation of the actuator motor 14 is required. If, in contrast, it is found that energization of the actuator motor 14 is required, for holding the side door 104 in its current state ("yes" in step S6), then the process passes to step S7, where the current strength required for the holding operation is calculated on the basis of the remaining active holding force which is required and is to be applied by the actuator motor 14, and its known output characteristics.

Finally, for starting the active holding operation, in step S8 the corresponding current strength is delivered to the actuator motor 14, for example by means of a pulse width modulation, and feedback operation is started, in which an adjustment of the necessary current strength is performed in the event of an undesired movement of the side door 104 being identified. In this case, an undesired movement refers to a behavior of the side door 104 which does not result from a manual opening or closing actuation by a user, i.e. for example a creeping pivot movement of the side door 104 triggered by too small or too great a holding force, or a movement of said door triggered by a gust of wind. In this case, the control unit 16 is capable of distinguishing, by means of comparing an identified action of force on the side door 104 with predetermined time profiles, whether the specific action of force was performed by a human user or is undesired.

In step S9 a check is now made as to whether a predetermined maximum holding time has elapsed since the start of the active holding operation. If this is the case ("yes" in step S9), then in step S10 the active holding operation is ended in that a protective closing movement of the side door is performed by corresponding actuation and energization of the actuator motor 14, by means of which the side door 104 is transferred into a state in which the passive holding force, introduced above, is sufficient for holding the side door 104, or the side door 104 is fully closed. Furthermore, while carrying out the protective closing movement, a corresponding optical and/or acoustic output is performed by means of the output unit 26, in order to inform the driver and/or occupants of the vehicle 100 of the protective closing movement of the side door 104.

In contrast, if the maximum holding time has not elapsed ("no" in S9), then a check is made in step S11 as to whether an error state is present in the side door drive assembly 10, for example whether one of the sensor units required for carrying out the method is not delivering data or is delivering obviously incorrect data. Should this be the case ("yes" in step S11), then the process passes to step S10, in the same way as just described, and the protective closing movement is performed.

If, in contrast, no error state is identified ("no" in step S11), then a check is made in step S12 as to whether an opening or closing of the side door 104 was triggered by a user, either manually by an action of force on the side door 104 or in the context of a request of an automatic opening or closing operation. If this is not the case ("no" in step S12), then the process passes again to step S8 and the holding operation is continued accordingly by delivering the necessary current strength to the actuator motor 14. If, in contrast, it is found that an opening or closing of the side door 104 has been triggered ("yes" in step S12), then the process ends, as does the active holding operation, in that the control unit 16 transitions into another operating mode of the side door drive assembly 10, in particular an active opening or closing operation or a supporting operation in the case of a manual actuation of the side door 104.

The invention claimed is:

1. An electric side door drive assembly for a vehicle, comprising:

a length-adjustable electric actuator which is arranged between a vehicle body and a side door of the vehicle, and which is configured to facilitate opening and closing of the side door and which comprises a controllable electric motor;

a control unit which is operationally coupled to the length-adjustable electric actuator and which is associated with a storage unit on which geometric parameters of the vehicle and operating parameters of the length-adjustable electric actuator are stored; and a door movement sensor unit which is operationally coupled to the control unit and is designed to detect stopping and a current position of the side door during opening or closing of said side door, wherein the control unit is designed, in the event of stopping of the side door detected by the door movement sensor unit:

to determine whether a passive holding force of the length-adjustable electric actuator is sufficient for holding the side door at its current position;

to determine, on the basis of side door position data provided by the door movement sensor unit, and the geometric parameters of the vehicle and the operating parameters of the length-adjustable electric actuator stored in the storage unit, a necessary current strength which is to be supplied to the controllable electric motor of the actuator in order to hold the side door in its current position; and to deliver a necessary current strength to the motor of the length-adjustable electric actuator for a holding operation.

2. The electric side door drive assembly according to claim 1, further comprising a tilt sensor unit which is operationally coupled to the control unit and is designed to detect a tilt of the vehicle relative to a horizontal plane, and/or a temperature sensor unit which is operationally coupled to the control unit and is designed for detecting a temperature of the controllable electric motor of the length-adjustable electric actuator, wherein the control unit is designed to take into account the tilt of the vehicle and/or the temperature of the controllable electric motor when determining the necessary current strength.

3. The electric side door drive assembly according to claim 1, wherein the length-adjustable electric actuator is designed as a spindle drive having a permanently excited brushed direct current motor or having a brushless direct current motor.

4. The electric side door drive assembly according to claim 1, wherein the control unit is integrated with the length-adjustable electric actuator.

5. The electric side door drive assembly according to claim 1, wherein the door movement sensor unit is formed by a position encoder associated with the length-adjustable electric actuator.

6. The electric side door drive assembly according to claim 1, wherein the control unit is designed to convert the determined necessary current strength into a duty cycle for a pulse width modulation operation of the controllable electric motor of the length-adjustable electric actuator, and to deliver a corresponding, pulse width modulated necessary current to the controllable electric motor.

7. The electric side door drive assembly according to claim 6, wherein the control unit is designed for normal operation of the controllable electric motor, in that, when a movement of the side door during the holding operation is identified, an adjustment of the necessary current strength or of the duty cycle is performed.

8. The electric side door drive assembly according to claim 1, wherein the control unit is designed to temporally limit the holding operation in that the delivery of current to the controllable electric motor of the length-adjustable electric actuator is ended after a maximum holding time.

9. The electric side door drive assembly according to claim 8, wherein the control unit is designed, after the maximum holding time has elapsed, to transfer the side door, in the context of a protective closing movement, into a state in which a passive holding force of the length-adjustable electric actuator is sufficient for holding the side door in this state or for completely closing the side door.

10. The electric side door drive assembly according to claim 9, further comprising an optical or acoustic output unit which is operationally coupled to the control unit and is designed to output a signal in the event of a directly imminent protective closing movement and/or during a protective closing movement.

11. The electric side door drive assembly according to claim 1, wherein the control unit is designed, upon detection of a manual actuation of the side door during the holding operation, to transfer the length-adjustable electric actuator into an active supporting operation, in which a force acting in the direction of the manual actuation is exerted on the side door, in that a corresponding supporting current is delivered to the controllable electric motor of the length-adjustable electric actuator.

12. The electric side door drive assembly according to claim 11, wherein during the detection of the manual actuation, a speed and/or an acceleration of the side door is furthermore detected, and the corresponding supporting current is adjusted on the basis of the detected speed and/or the acceleration of the side door.

13. The electric side door drive assembly according to claim 1, wherein the parameters of the vehicle stored in the storage unit include a mass and/or a center of gravity of the side door, and/or the operating parameters of the length-adjustable electric actuator include a friction, an efficiency, a transmission and/or a motor constant of the length-adjustable electric actuator.

14. A vehicle comprising the vehicle body and the side door pivotably hinged thereto, wherein a side door drive assembly according to claim 1 is arranged between the vehicle body and the side door.

15. A method performed by a control unit for operating an electric side door drive assembly, comprising the steps of:

determining stopping of the side door during opening or closing, and the current position of the side door;

determining whether a passive holding force of the length-adjustable electric actuator is sufficient for holding the side door at its current position;

determining a necessary current strength on the basis of side door position data, the geometric parameters of the vehicle and the operating parameters of the length-adjustable electric actuator; and delivering the necessary current strength to the controllable electric motor of the length-adjustable electric actuator for a holding operation.

* * * * *